United States Patent
Ikeda et al.

(10) Patent No.: US 7,348,518 B2
(45) Date of Patent: Mar. 25, 2008

(54) WELDING APPARATUS

(75) Inventors: Tatsuya Ikeda, Kawanishi (JP); Yasuzo Tsuchiya, Toyonaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 274 days.

(21) Appl. No.: 10/555,558

(22) PCT Filed: Feb. 21, 2005

(86) PCT No.: PCT/JP2005/002722

§ 371 (c)(1),
(2), (4) Date: Nov. 4, 2005

(87) PCT Pub. No.: WO2005/084869

PCT Pub. Date: Sep. 15, 2005

(65) Prior Publication Data

US 2007/0075064 A1    Apr. 5, 2007

(30) Foreign Application Priority Data

Mar. 9, 2004    (JP)    ............................. 2004-065177

(51) Int. Cl.
*B23K 9/095*    (2006.01)

(52) U.S. Cl. ............................... 219/137.71; 219/125.1
(58) Field of Classification Search ........... 219/130.01, 219/125.1, 137.71
See application file for complete search history.

(56) References Cited

U.S. PATENT DOCUMENTS 5,412,175 A * 5/1995 Shimogama ........... 219/130.01

FOREIGN PATENT DOCUMENTS

| JP | 64-62276 A | * | 3/1989 |
| JP | 2-217168 A | * | 8/1990 |
| JP | 3-69623 | | 11/1991 |
| JP | 5-245638 A | * | 9/1993 |
| JP | 2002-137060 A | * | 5/2002 |

* cited by examiner

*Primary Examiner*—Clifford C. Shaw
(74) *Attorney, Agent, or Firm*—Pearne & Gordon LLP

(57) ABSTRACT

A welding apparatus capable of effecting welding completion processing which is reliable and free of wasteful time, by transmitting the completion of wire fusion prevention processing to a welding machine 11, by transmitting the detected result to a controller 17 upon completion of the subsequent wire fusion detection processing, and by thus proceeding with processing while effecting the confirmation of completion of respective processing between the welding machine 11 and the controller 17.

4 Claims, 3 Drawing Sheets

WELDING APPARATUS

TECHNICAL FIELD

The present invention relates to a welding apparatus using, for example, a robot or the like which relatively moves a base metal and a welding wire.

BACKGROUND ART

An automatic welding apparatus which relatively moves a base metal and a welding wire is comprised of a welding machine and a controller which controls the movement of a welding torch for holding the welding wire.

With such an automatic welding apparatus, it is necessary to move to an ensuing operation after confirming that the welding wire and the base metal have not been fused together upon completion of welding.

If the welding torch is moved with the welding wire remaining fused, an excessively large force is applied to the welding torch, which will deform the welding torch, so that the detection of the fusion of the welding wire is an essential requirement in automatic welding.

Referring to FIG. 3, a description will be given of a conventional technique of detecting the fusion of the welding wire.

In FIG. 3, reference numeral 11 denotes a welding machine; 12, a welding wire feed motor; 13, welding wire; 17, a controller; 19, a resistor; and 18, a base metal.

At a position of welding completion, the controller 17 commands welding completion to the welding machine 11. To complete welding, the welding machine 11 first stops the wire feed motor 12, but continues to output a specific welding output, and stops the welding output to the welding wire 13 after the wire feeding by the inertia of the motor has stopped.

This processing of the welding machine is for preventing fusion between the welding wire 13 and the base metal 18, and is generally referred to as wire fusion prevention processing.

By assuming that the welding machine 11 has stopped the welding output in a fixed period of time after commanding welding completion, the controller 17 applies a voltage between the welding machine 13 and the base metal 18 through a resistor 19.

If the welding machine 13 and the base metal 18 have not fused together, the voltage applied from the controller is detected as it is between the welding machine 13 and the base metal 18.

On the other hand, if the welding machine 13 and the base metal 18 have fused together, the voltage applied from the controller 17 is applied to the resistor inserted in series, and the voltage is not detected between the welding machine 13 and the base metal 18.

The controller 17 is able to confirm the presence or absence of the fusion of the welding wire on the basis of this voltage between the welding machine 13 and the base metal 18. After confirming that they have not been fused together, the operation conventionally proceeds to an ensuing operation.

In addition, a conventional arc welding process is known wherein processing is executed in a case where the wire fusion has been detected, the fusion is removed by reapplying a welding voltage between the base metal and the welding wire, and the fusion is removed by effecting the feeding of the welding wire at a low speed, stopping the feeding of the welding wire after the lapse of a predetermined time, shutting of welding voltage, or by applying the welding voltage, and wherein the number of times of execution of this processing is counted, and the fusion removal operation is executed only a predetermined number of times (e.g., refer to patent document 1).

Patent document 1: JP-B-03-069623

DISCLOSURE OF THE INVENTION

However, according to this detection method, there have been problems in that if accurate detection is to be carried out, a long time is entailed, and if the time is to be reduced, erroneous detection occurs.

Namely, the controller, after issuing a welding completion command, effects the fusion detection with a time lag incorporating an estimated time when the welding machine completes the wire fusion prevention processing. However, there has been a problem in that if this time lag is set to be short for the purpose of reducing the working time, the fusion detection is started during the wire fusion prevention processing, and correct detection cannot be made.

To overcome this, it suffices if an optimum time lag is determined by measuring the wire fusion prevention processing time. However, since the wire fusion prevention processing time of the welding machine depends on the welding wire feeding rate based on the inertia of the motor, the wire fusion prevention processing time depends on the rotational speed of the motor, i.e., the welding current. Hence, the time changes due to the magnitude of the welding current, and a longer time lag is inevitably taken to avoid erroneous detection, causing a decline in the operating efficiency.

To overcome the above-described problems, the welding apparatus in accordance with the invention is a welding apparatus comprising: a welding machine for outputting welding electric power to between a base metal and a welding wire; and a controller for controlling moving means for relatively moving the base metal and the welding wire, wherein the welding machine includes communication means for effecting communication with the controller, storage means for storing a command transmitted from the controller, a welding output control unit for effecting fusion prevention processing of the welding wire when the command stored in the storage means indicates welding completion, and welding wire fusion detection means for detecting fusion between the base metal and the welding wire after the fusion prevention processing, and a result of the welding wire fusion detection is transmitted from the welding machine to the controller through the communication means, or a welding apparatus comprising: a welding machine for outputting welding electric power to between a base metal and a welding wire; and a controller for controlling moving means for relatively moving the base metal and the welding wire, wherein the welding machine includes communication means for effecting communication with the controller, storage means for storing a command transmitted from the controller, and a welding output control unit for effecting fusion prevention processing of the welding wire when the command stored in the storage means indicates welding completion, wherein the controller has welding wire fusion detection means for detecting fusion between the base metal and the welding wire, and wherein a signal representative of the completion of fusion prevention processing of the welding wire is transmitted from the welding machine to the controller through the communication means, and the controller, upon receiving the signal representative of the completion of fusion prevention processing of the welding wire, operates the welding wire fusion detection means. As a result, the transmission and reception of completion signals of respective processing are carried out between the welding machine and the controller at respective steps of the welding completion processing. Thus, wasteful wait time is eliminated, and the fusion detection can be carried out reliably.

As described above, the invention is able to realize an outstanding welding apparatus capable of effecting welding completion processing which is reliable and free of wasteful time, by transmitting the completion of wire fusion prevention processing to the welding machine, by transmitting the detected result to the controller upon completion of the subsequent wire fusion detection processing, and by thus proceeding with processing while effecting the confirmation of completion of respective processing between the welding machine and the controller.

DESCRIPTION OF REFERENCE NUMERALS AND SIGNS

Figure 1:
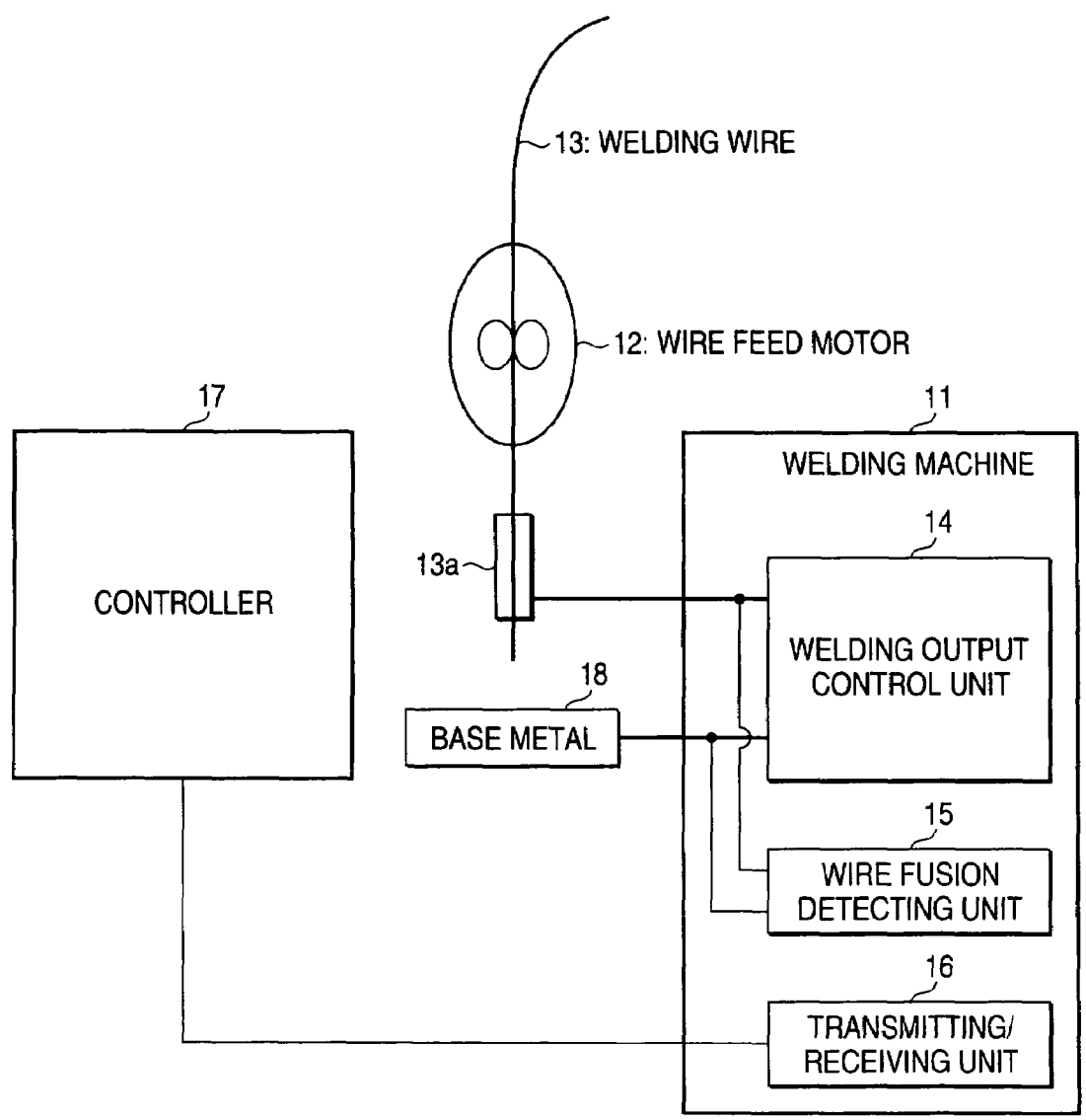
FIG. 1 is a block diagram in accordance with a first and a second embodiment of the invention.

11: welding machine
12: wire feed motor
13: welding wire
14: welding output control unit
15: wire fusion detecting unit
16: transmitting/receiving unit
17: controller
18: base metal

BEST MODE FOR CARRYING OUT THE INVENTION

First Embodiment

Hereafter, a description will be given of an embodiment of the invention with reference to FIG. 1.

In FIG. 1, reference numeral 11 denotes a welding machine; 12, a wire feed motor; 13, a welding wire; 13a, a welding torch; 18, a base metal; 14, welding output control unit; 15, a wire fusion detecting unit; and 16, a command transmitting/receiving unit which receives and stores a plurality of commands transmits various states of the welding machine to a controller 17. Reference numeral 17 denotes the controller which provides supervisory control of the welding machine, including such as the movement and welding start and completion of the welding torch 13a.

When the welding torch 13a reaches a point of welding completion, the controller 17 issues two commands, including a welding completion command and a wire fusion detection command, to the welding machine 11, and then waits for a response from the welding machine 11.

The welding machine 11 stores the received two commands, stops the wire feed motor 12 to execute the welding completion command received earlier, and executes the fusion prevention processing by means of the welding output control unit 14.

Upon completion of the fusion prevention processing, the welding machine 11 then executes the wire fusion detection command issued by the controller 17 by means of the wire fusion detecting unit 15, and transmits its result to the controller 17 through the transmitting/receiving unit 16. The controller 17, upon receiving the result of the wire fusion detection from the welding machine 11, proceeds with the execution of an ensuing operation.

Since the welding machine 11 thus has the functions of storing the received plurality of commands and sequentially executing the stored commands, the processing of the conventional art is not required in which the controller 17, after issuing a welding completion command, effects a wire fusion detection command with a time lag incorporating an estimated time when the welding machine 11 completes the fusion prevention processing. Thus, wasteful wait time is eliminated, and the fusion detection can be carried out reliably.

Second Embodiment

Referring to FIG. 1, a description will be given of a welding apparatus in accordance with a second embodiment of the invention.

In this embodiment, when the welding torch 13a reaches a point of welding completion, the controller 17 commands the welding machine 11 to effect welding completion.

The welding machine 11 stops the wire feed motor 12, effects blazing processing by means of the welding output control unit 14, and upon completion of the fusion prevention processing, transmits this to the controller 17 through the transmitting/receiving unit 16.

Upon being notified of the fusion prevention processing, the controller 17 issues a wire fusion detection processing to the welding wire 11. The welding machine 11 carries out the wire fusion processing detection by means of the wire fusion detecting unit 15, and transmits its result to the controller 17 through the transmitting/receiving unit 16.

On the basis of the result of the wire fusion detection from the welding machine 11, the controller 17 proceeds with the execution of an ensuing operation.

Thus, the transmission and reception of completion signals of respective processing are carried out between the welding machine and the controller at the respective steps of the welding completion processing. Thus, wasteful wait time is eliminated, and the fusion detection can be carried out reliably.

Third Embodiment

Figure 2:
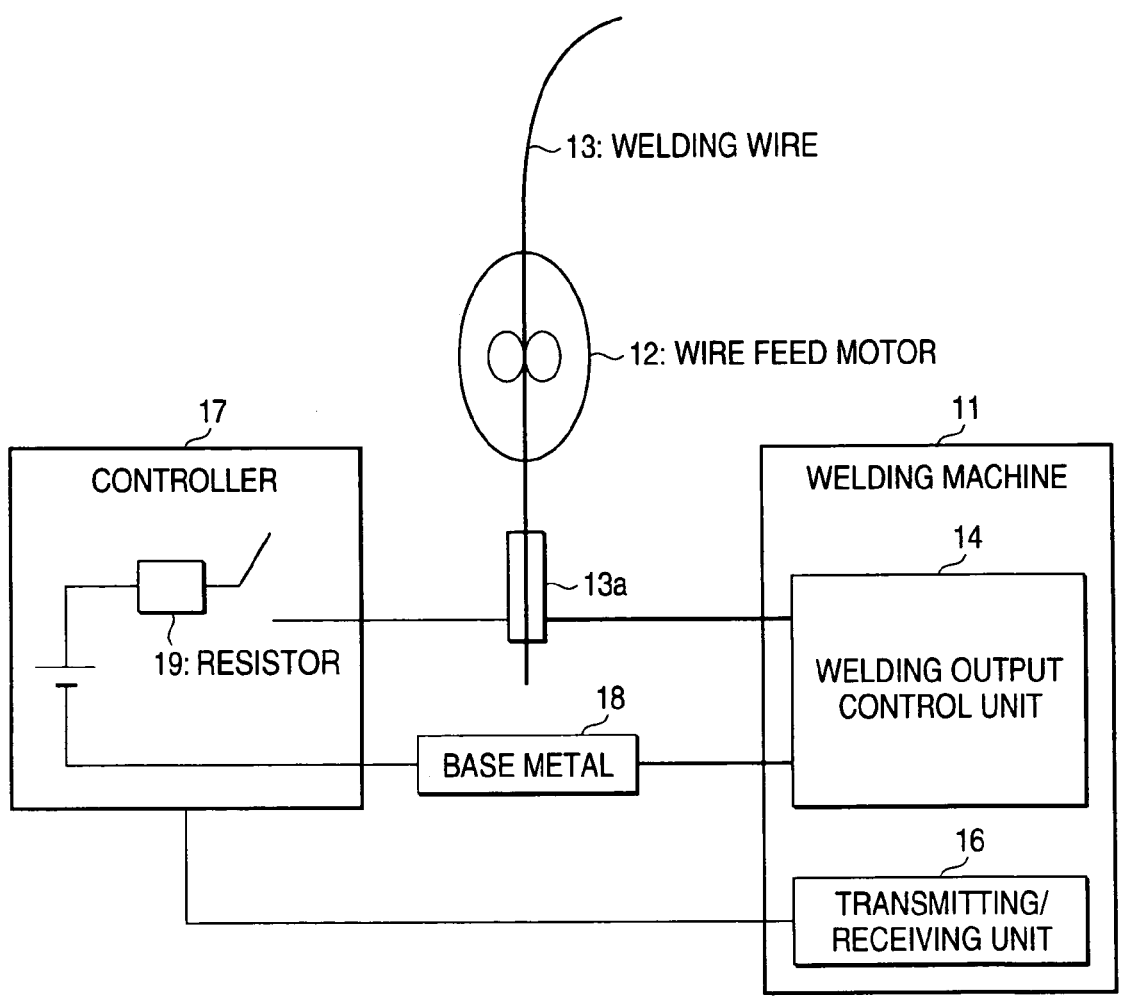
FIG. 2 is a block diagram in accordance with a third embodiment of the invention.
Figure 3:
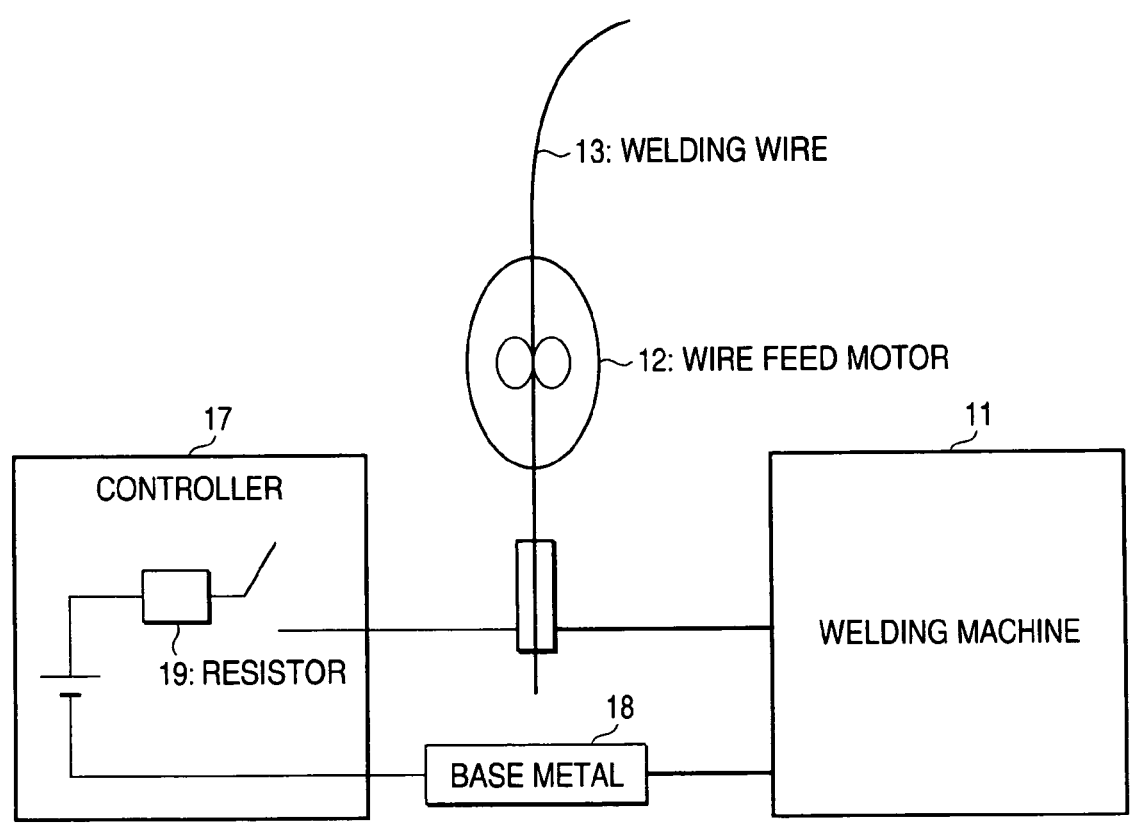
FIG. 3 is a block diagram in accordance with a conventional welding apparatus.

Referring to FIG. 2, a description will be given of a third embodiment of the invention.

It should be noted that the arrangements similar to those of the above-described first and second embodiments will be denoted by the same reference numerals, and a description thereof will be omitted.

The difference between this third embodiment and the above-described first and second embodiments lies in that the fusion detection function is present not in the welding machine 11 but on the controller 17 side.

In this embodiment, when the welding torch 13a reaches a point of welding completion, the controller 17 commands the welding machine 11 to effect welding completion.

The welding machine 11 stops the wire feed motor 12, effects fusion prevention processing by means of the welding output control unit 14, and upon completion of the fusion prevention processing, transmits this to the controller 17 through the transmitting/receiving unit 16.

Upon being notified of this, the controller 17 executes the ensuing wire fusion detection processing.

The controller 17, after receiving the completion of fusion prevention processing from the welding machine 11, applies a voltage across the welding wire 13 and the base metal 18 through a resistor 19.

If the welding wire 13 and the base metal 18 have not been fused together, the voltage applied by the controller is observed as it is between the welding wire 13 and 20 the base metal 18.

If the welding wire 13 and the base metal 18 have been fused together, the voltage applied by the controller is applied to the resistor interposed in series, and the voltage is not observed between the welding wire 13 and the base metal 18.

As the result of this voltage between the welding wire 13 and the base metal 18, the controller 17 is able to confirm the presence or absence of wire fusion, and after confirming that they have not been fused, the controller 17 proceeds with an ensuing operation. The controller 17 thus proceeds with the ensuing operation on the basis of the result of wire fusion detection effected by itself.

Thus, the transmission and reception of completion signals of respective processing are carried out between the welding machine and the controller at the respective steps of the welding completion processing. Thus, wasteful wait time is eliminated, and the fusion detection can be carried out reliably.

Although the invention has been described in detail and by referring to specific embodiments, it will be apparent to those skilled in the art that various changes and modifications may be made thereto without departing from the spirit and scope of the invention.

This application is based on Japanese Patent Application filed on Mar. 9, 2004 (Japanese Patent Application No. 2004-065177), the contents of which are incorporated herein by reference.

INDUSTRIAL APPLICABILITY

According to the welding apparatus in accordance with the invention, it is possible to provide a welding apparatus optimally suited to automatic welding which makes it possible to effect welding completion processing which is reliable and free of wasteful time, by proceeding with processing while effecting the confirmation of completion of respective processing between the welding machine and the controller.

The invention claimed is:

1. A welding apparatus comprising:
    a welding machine for outputting welding electric power to between a base metal and a welding wire; and
    a controller for issuing a welding completion command and a wire fusion detection command to the welding machine,
    wherein the welding machine includes a communication unit for effecting communication with the controller, a storage unit for storing the welding completion command and the wire fusion detection command, a welding output control unit for effecting fusion prevention processing of the welding wire in case that the storage unit stores the welding completion command, and a welding wire fusion detection unit for detecting fusion between the base metal and the welding wire after the fusion prevention processing in case that the storage unit stores the wire fusion detection command,
    wherein the communication unit receives the welding completion command and the wire fusion detection command from the controller and transmits a result of the welding wire fusion detection to the controller.

2. A welding apparatus comprising:
    a welding machine for outputting welding electric power to between a base metal and a welding wire; and
    a controller for issuing a welding completion command to the welding machine,
    wherein the welding machine includes a communication unit for effecting communication with the controller, a storage unit for storing the welding completion command, and a welding output control unit for effecting fusion prevention processing of the welding wire in case that the storage unit stores the welding completion command,
    wherein the controller has a welding wire fusion detection unit for detecting fusion between the base metal and the welding wire,
    wherein the communication unit receives the welding completion command from the controller and
    wherein the communication unit transmits a signal representation of the completion of fusion prevention processing of the welding wire, and the controller, upon receiving the signal representative of the completion of fusion prevention processing of the welding wire, operates the welding wire fusion detection unit.

3. A welding method using the welding apparatus of claim 1, said method comprising the steps of:
    issuing a welding completion command and a wire fusion detection command from a controller to a welding machine;
    storing the welding completion command and the wire fusion detection command in a storage unit;
    executing the welding completion command;
    effecting a fusion prevention processing;
    executing the wire fusion detection command in a welding wire fusion detection unit; and
    transmitting a result of the welding wire fusion detection from the welding machine to the controller through a communication unit.

4. A welding method using the welding apparatus of claim 2, said method comprising the steps of:
    issuing a welding completion command from a controller to a welding machine;
    effecting a fusion prevention processing;
    transmitting a result of the fusion prevention processing from the welding machine to the controller through a communication unit;
    issuing a wire fusion detection command from the controller to the welding machine;
    executing the wire fusion detection command in a welding wire fusion detection unit; and
    transmitting a result of the welding wire fusion detection from the welding machine to the controller through the communication unit.

* * * * *